Dec. 27, 1955 L. C. ERICKSON 2,728,445
HEAVY DUTY CONVEYOR BELT DRIVE
Filed March 31, 1954 3 Sheets-Sheet 1

INVENTOR.
LEWIS C. ERICKSON
BY
Richard P. Cardew
AGENT

Dec. 27, 1955 L. C. ERICKSON 2,728,445
HEAVY DUTY CONVEYOR BELT DRIVE
Filed March 31, 1954 3 Sheets-Sheet 2

INVENTOR.
LEWIS C. ERICKSON
BY
Richard P. Cardew
AGENT

Dec. 27, 1955   L. C. ERICKSON   2,728,445
HEAVY DUTY CONVEYOR BELT DRIVE
Filed March 31, 1954   3 Sheets-Sheet 3

INVENTOR.
LEWIS C. ERICKSON
BY
*Richard P. Cardew*
AGENT

2,728,445

HEAVY DUTY CONVEYOR BELT DRIVE

Lewis C. Erickson, Duluth, Minn.

Application March 31, 1954, Serial No. 420,041

4 Claims. (Cl. 198—203)

This invention relates to a driving means for heavy duty belt conveyors such as are now in common use in many industries, such as the mining industry, and is a continuation-in-part from my co-pending application for patent Serial No. 246,310, filed September 12, 1951, and now abandoned, and entitled Heavy Duty Conveyor Belt Drive.

It has been found quite feasible and practical to move large quantities of heavy ores, and/or strippings, over considerable distances and up relatively steep inclinations on conveyor belts which run up to six hundred feet per minute, or more. Obviously, the long conveyor belts are of a heavy duty construction, and the external surfaces of the belt are usually rubber covered for durability and have reinforcing means, such as plys of duck, or steel or cotton cord strands, embedded in the rubber to provide strength for the belt. These heavy duty conveyor belts, because they handle such large loads and are of such relatively long length, require a relatively high horsepower driving means and consequently operate under high tensions. These high tension conveyor applications have been in use only about twenty or twenty-five years and have been made possible by the rapid advances made in the construction of conveyor belts themselves to withstand their heavy duty usage.

However, the heavy duty conveyor belt installations have one common defect—their driving means. Heavy duty conveyor belting averages thirty-six inches in width, but, they vary between twenty-four inches and sixty inches in width, and the shell of the drive pulley must be wider than the belt, of course. To achieve proper tractive effort, the head or drive pulleys for these belts usually vary from forty-eight inches to seventy-two or more inches in diameter on drives of one hundred horsepower or more. Thus, it is apparent that a very large drive or head pulley must be suitably mounted to drive the conveyor, and that this pulley and its mounting must be able to withstand the high tension of the conveyor belt which may be thirty thousand pounds or more.

In addition to the above problems of heavy duty conveyor drives, a high horsepower electric motor is usually employed to drive the head pulley, and this motor, obviously, rotates faster than the desired speed of rotation of the head pulley; therefore, a speed reducer is employed between the motor and the head pulley. Here is where real difficulty comes in. The speed reducers commonly employed in these high tension or heavy duty conveyor systems are very large and contain several large and expensive gears mounted in bearings which extend transversely of a suitable housing. They have a high speed shaft extending therefrom to which the motor is coupled and a low speed shaft extending therefrom to which the head pulley is coupled to be driven at the desired rotative speed. It is well known that it is extremely difficult to aline more than two bearings on a high torque shaft, as there is a great deal of inherent flexibility in shafting and supporting structures for the shafting; and because the speed reducer low speed shaft is already mounted in two bearings, it has been common practice in the heavy duty conveyor art to mount the head pulley on a separate shaft of its own which is mounted in pillow blocks, the pulley shaft being substantially alined with the reducer's low speed shaft whereby a conventional heavy duty flexible coupling may be used to join the two shafts, it being noted that these low speed shafts of the reducer and the head pulley are high torque applications which are subject to extreme stresses in operation.

Most conveyor drives are mounted on structural steel frameworks as a part of mine buildings, shipping pockets, etc., where it is almost impossible to eliminate deflections in the drive unit. These mountings necessitate the provision of a very large, strong common base member on which all of the drive components may be mounted in order to minimize the misalinements which may occur between the shaft of the motor and high-speed shaft of the reducer, and, particularly between the low-speed high-torque shaft of the reducer and the head pulley shaft. This base must be very strong and must be large enough to accommodate all parts of the drive; therefore, it is very heavy and very expensive; yet, because of the inherent flexibility of the materials from which it is made, it is not perfectly rigid and does not prevent the various shafts from becoming misalined. In fact, the various shafts become misalined to the extent that even the flexible couplings break down. Because of this fact, a low-speed back-stop must be provided on the pulley shaft and a high-speed back-stop must be provided between the reducer and the flexible coupling to the motor shaft to prevent the conveyor from reversing and running backward with its load. This latter circumstance could be disastrous to the conveyor equipment, of course. The back-stops are conventional equipment but are very expensive, especially the back-stop on the head pulley shaft. The high-speed back-stop is provided because it is a low-torque application and, consequently, is a simple, fool-proof unit and provides additional protection. The low-speed back-stop is necessary because failure of the low-speed coupling is common.

In addition, there is another factor which must be considered in mounting the pulley of a high-tension high-torque conveyor drive assembly: the shaft bending moment arm which governs overhung loading on a given shaft. Shaft bending moment arm may be defined as the distance from the center of the load applied to the shaft to the center of the bearing supporting the shaft. The moment arm of a shaft must be kept at a minimum; therefore, in conventional heavy duty drive installations, the drive or head pulley has two spaced alined hubs, one adjacent each outer edge of the pulley, a diametrically disposed web being employed between each of the hubs and its respective outer edge of the pulley shell. This arrangement creates a relatively short moment arm between each of the hubs and the adjacent bearing or pillow block in which the pulley shaft is carried. However, this also creates a problem in mounting and dismounting a two-hub pulley on a shaft as conventionally each of the pulley hubs is keyed in place, and the keyways on each of the spaced hubs must be cut exactly in alinement with each other. This is a very difficult machining operation, as is well known. The mounting and dismounting of a two-hub pulley is additionally difficult in that the two hubs must be maintained in their exact predetermined spaced relation to each other to prevent binding of the shaft between the two hubs.

It is common and accepted practice to employ the above described structure and arrangement in heavy duty conveyor design. An alternative to this design, however, employs a separate head pulley shaft mounted in pillow blocks, the heavy duty common base for the parts of the drive, the low-speed back-stop, speed reducer, motor, etc., however, instead of placing the head pulley shaft in axial alinement with the output shaft of the speed reducer, they are spaced apart with their axes in parallel relation to each other. A chain sprocket is employed on each of the shafts, and a chain is wrapped around the sprockets for driving the head pulley shaft from the speed reducer.

A rule of thumb governs the size of the sprocket on the output shaft of the speed reducer and requires that the minimum diameter of the sprocket be at least three times the diameter of the output shaft. It is conventional and accepted practice to use the smallest permissible sprocket on the output shaft. A large diameter sprocket is mounted on the head pulley shaft so that the chain drive will provide further reduction in the speed of rotation of the head pulley shaft. This is good economics, of course, inasmuch as the speed of the head pulley shaft must be reduced and the amount of reduction made in the chain drive is less expensive than it would be if this additional amount of reduction were embodied in the speed reducer itself.

This alternate form of the invention is but little less expensive than the other, and does not eliminate the need for excessively large and heavy base and mountings nor the need for an excessive number of parts in the drive. Also, the chain of the drive is usually the part most subject to breakdown.

Thus we have alinement problems, problems of physical size, problems of cost, back-stop problems, and pulley construction and mounting problems before us. In addition, we have inspection, lubrication, and maintenance problems. The various bearings, back-stops, couplings, and shafting require constant inspection, and the various separate parts require lubrication and maintenance. The lubricating of the bearings, etc., of a conventional heavy duty conveyor drive is very dangerous for a workman unless the conveyor is shut down, as he must climb around the drive units to get at the bearings to lubricate them. Work stoppages are costly, of course. In addition, because of the large number of components in the drive, maintenance problems are necessarily a big consideration. For example, if it is desired or necessary to remove or replace the head pulley of a conventional drive assembly, the pulley shaft must be uncoupled from the reducer, it must be removed from its bearings, and then the shaft removal difficulties above described must be overcome. All of this work is time consuming and the conveyor must be shut down for the duration of the repair job, of course.

All of the above disadvantages and difficulties encountered in heavy duty conveyor drives have been prevalent since the inception of high tension applications.

It is, therefore, one of my principal objects to provide an improved driving means for a heavy-duty high-tension conveyor belt system.

Another object is to eliminate complicated alinement problems from such heavy-duty conveyor drives, and to reduce overall size and weight.

Another object is to reduce the number of components in a heavy-duty conveyor drive, whereby the cost of the unit will be less as will the possibility of mechanical failure, and whereby a large and heavy base is not essential to the mounting and operation of the device, and whereby requirements for servicing and maintenance will be correspondingly less.

Another object is to provide a heavy-duty conveyor drive which requires much less room for mounting than conventional drives, whereby supporting structures may be kept at a minimum size.

Another more specific object is to provide a drive for a heavy-duty conveyor application in which the head pulley is mounted as an overhung load directly on the low-speed shaft of a speed reducer.

Another such object is to mount a larger diameter head pulley of a heavy duty conveyor drive directly on the relatively small diameter output shaft of a speed reducer.

These and other objects and advantages will become more apparent as the description of my invention proceeds.

In the accompanying drawing forming a part of this application:

Figure 1:
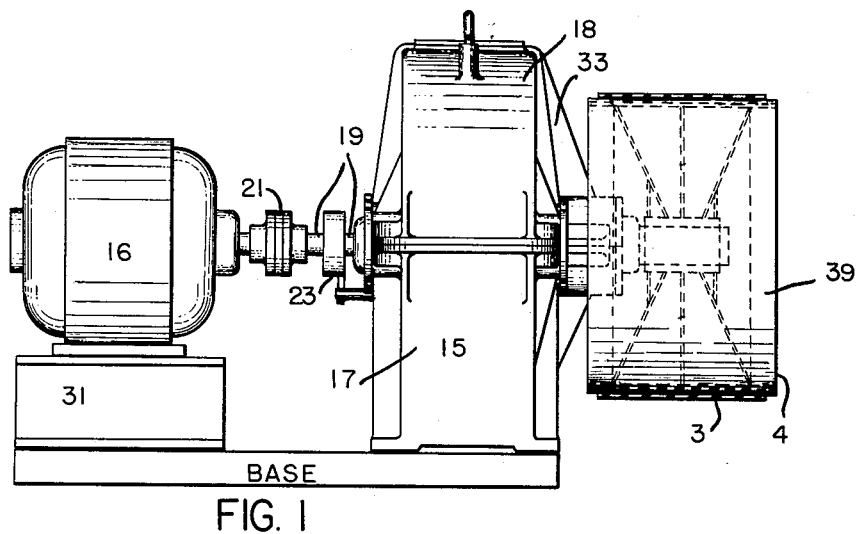
Figure 1 is an end elevational view showing one of my complete drive assemblies.
Figure 2:
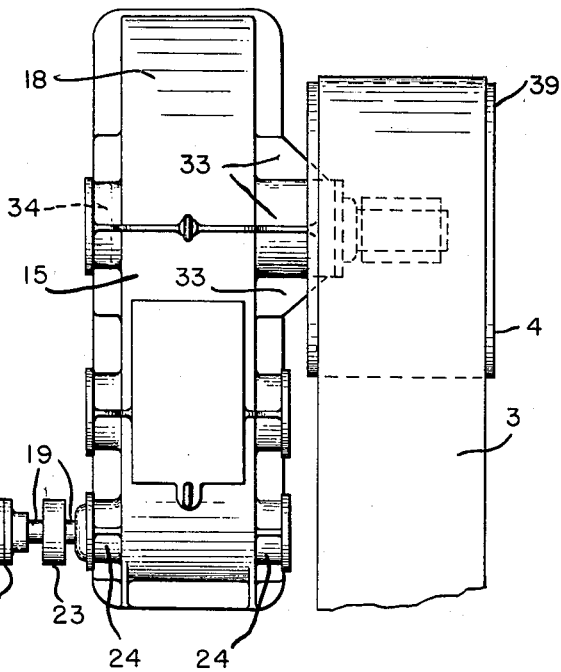
Figure 2 is a top plan view of Figure 1.
Figure 3:
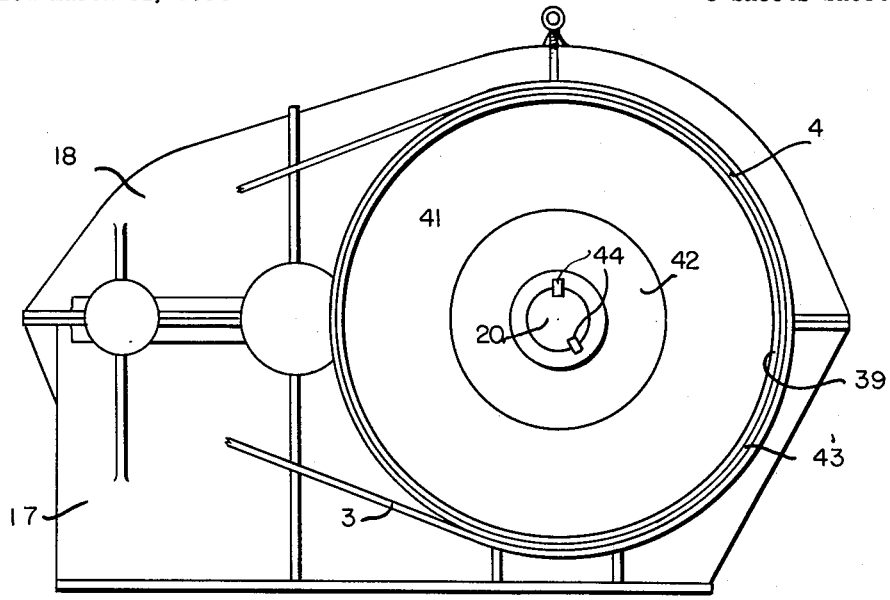
Figure 3 is a side elevational view of the device shown in Figure 1 with parts drawn to proper proportion.
Figure 4:
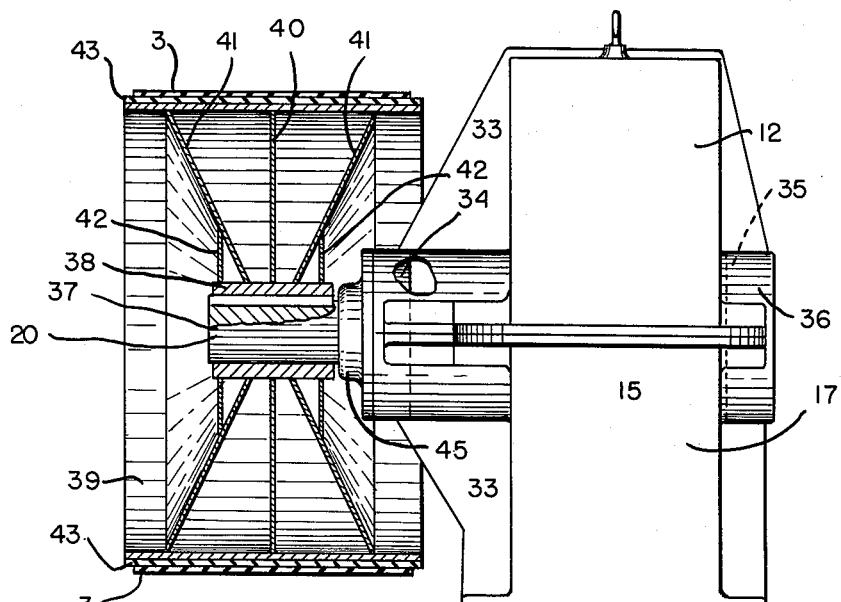
Figure 4 is a vertical sectional view through the drive pulley shown in Figure 3 to show the construction and mounting thereof, as well as the relative proportion of the parts.
Figure 5:
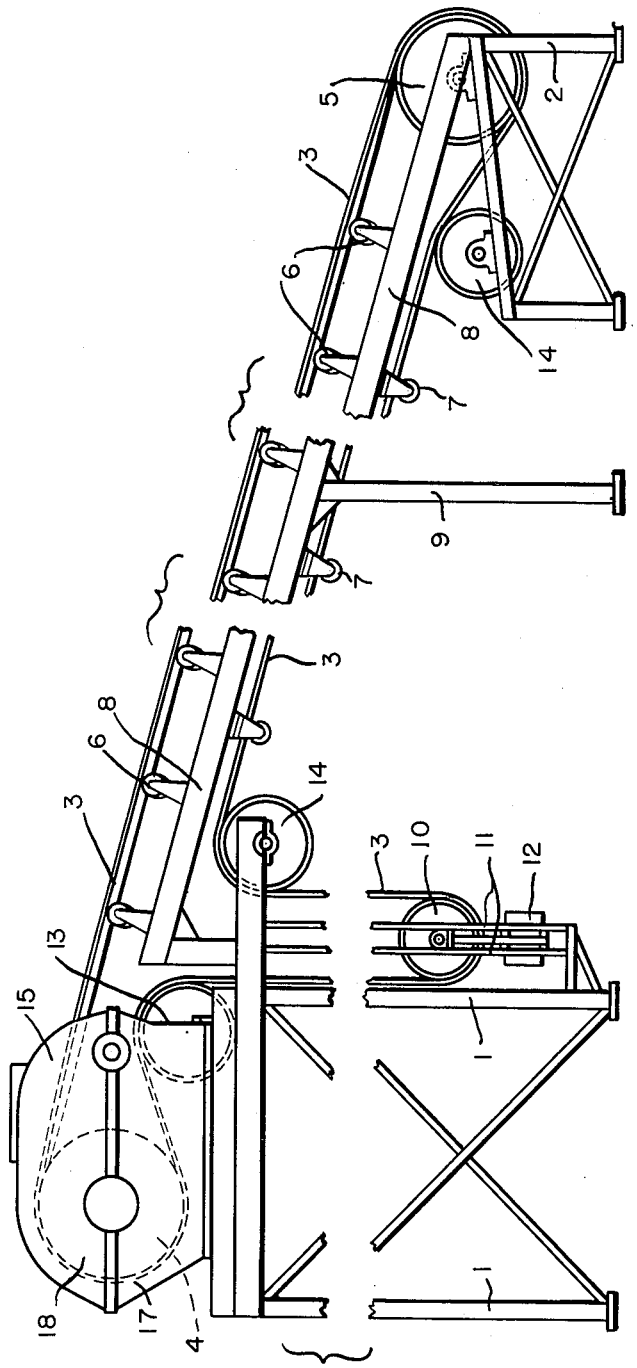
Figure 5 is a diagrammatic view of a heavy-duty conveyor installation.

In the drawing, the reference numeral 1 indicates the supporting structure which carries the upper or drive end of a conveyor system, which supporting structure may be a part of a mine building, shipping pocket, or the like. The numeral 2 indicates the supporting structure for the opposite or loading end of the conveyor system, which may be located two thousand feet or more from the drive end of the system and at a considerably lower elevation than the head end of the system. For example, the loading end of the conveyor may be at the bottom of an open pit mine, while the head end thereof is on the outer rim of the pit, as conveyors are operated at angles of up to eighteen degrees. The conveyor belt 3 is endless and is carried between the head pulley 4 and the tail pulley 5, suitably spaced idler rollers, 6 and 7 respectively, being provided to carry and support the upper and lower strands of the belt 3 intermediate the head and tail pulleys, the idlers being carried on a suitable gallery 8 supported at intervals by standards 9 or the like.

All heavy-duty conveyors have a belt take-up or tensioning means, here shown as a gravity take-up comprising an idler pulley 10 on which the belt runs and which is vertically slidably carried on guides 11. A weight 12 is provided to supply the necessary tension to the belt. Snub pulleys 13 and 14 provide the support for the belt above the take-up pulley 10, as shown, and in addition, the snub pulley 13 may serve to increase the wrap of the belt around the drive pulley to give proper tractive effort for the driving of the belt, all of which is conventional.

In my invention, I provide a speed reducer 15 which reduces the speed of the high horsepower motor 16 to drive the conveyor at its desired speed. The speed reducer comprises a casing having a lower section 17 and an upper section 18, the two sections being united preferably along the centerline of the input shaft 19 and the output shaft 20 to provide an enclosed oil-tight casing or housing for the internal mechanism of the reducer, and to provide an efficient means to mount bearings in which the shafting of the reducer may be carried, as will become apparent.

As shown in the drawing, the motor 16 is coupled to the input shaft 19 by means of a flexible coupling 21 which compensates for any misalinements which may occur between the motor shaft 22 and the input shaft 19 of the reducer under operating conditions. The input shaft 19 is a high-speed, low-torque application, and misalinements are not likely or serious; however, I prefer to mount a conventional low-torque back-stop 23, of any suitable design, on the input shaft 19, as shown, as a safety factor to prevent the conveyor belt from going backwards in the event of a drive failure.

As seen in the drawings, the input shaft is mounted in suitable bearings carried in the hub-like extensions or bearing housings 24—24 provided in the casing along the line of joining of the upper and lower sections of the casing 15. This facilitates the mounting of the shaft and bearings, as is deemed apparent, all of the shafting of the reducer being similarly mounted.

The head pulley 4, in heavy duty conveyor drives may run from forty-eight to seventy-two inches in diameter, though an average pulley is probably about fifty-four inches in diameter, and the shell varies in width in accordance with the width of the conveyor belt 3.

In order to mount the head pulley 4 as an overhung load, I have provided a bearing housing 32 extending a considerable distance laterally from the casing 15, the bearing housing 32 being supported and reinforced by vertical and horizontal ribs 33 extending between the housing 32 and the casing 15, as shown. A bearing 34 is carried adjacent the outer end of the housing 32, one side of the shaft 20 being carried by this bearing. The opposite end of the shaft 20 is carried in a bearing 35 which is mounted in the bearing housing 36 in opposed alined relationship to the bearing 34 to support the low-speed shaft 20. A portion 37 of the shaft 20 extends outwardly of the bearing 34 to receive the head or drive pulley 4 for the conveyor system as an overhung load. The output shaft of an average speed reducer used in conventional conveyor drives is usually not more than seven and one-half inches in diameter, and as stated above, it is conventional practice to employ as small a pulley or sprocket as permissible on the output shaft. Thus, an average conveyor installation using a sprocket drive from the output shaft of the speed reducer will have a sprocket of about twenty-two and one-half inches in diameter. In my invention, it will be seen, I have departed radically from the conventional practice in providing a head pulley mounted as an overhung load on the output shaft of the speed reducer. In my invention the head pulley is from six to ten times greater in diameter than the output shaft while conventional practice dictates a pulley of only three times the diameter of the output shaft.

It will thus be seen that engineers and others skilled in the art of designing conveyor drives have decided on and for years practiced the separate mounting of a head pulley shaft in pillow blocks, instead of a heavy base, couplings or chain drives, back-stops, and the like, rather than depart from accepted and proven practices of not using the smallest possible diameter of drive sprocket or the like on a speed reducer.

The head pulley 4 is of unique construction when considering conventional conveyor drive pulleys in that it has a single hub 38 by means of which it is carried and supported on the output shaft of the reducer, the hub being located in the center of the pulley diametrically and transversely and being considerably less in its width than the width of the pulley shell 39, as shown. The pulley shell and hub are connected by a plurality of webs. A central ring-like web 40 extends between the center of the hub and the center of the shell and is mounted so as to extend normally to the axis of rotation of the pulley.

Both sides of the web are welded to the pulley shell and to the hub, whereby a fixed rigid union is obtained. In addition, a cone-shaped web 41 is welded in place on each side of the central web and in spaced relation thereto between the hub and the pulley shell, the inner edges of the cone webs being preferably welded to the hub substantially centrally between the central perpendicular web and the outer ends of the hub, as shown, and the outer edges of the cone-web being welded to the pulley shell in inwardly spaced relation to the outer edge of the shell, but materially spaced from the central web 40, as shown. Obviously, these cone-webs 41 can only be welded to the hub and shell on their outer edges, as the inner edges are inaccessible. I have also provided relatively small outer ring-like webs 42 which extend between and are welded to each of the outer ends of the hub and the cone-webs 41, the outer webs preferably being about one-half the diameter of the inner or central web 40, as shown.

The outer surface of the pulley shell 39 is preferably provided with a layer of rubber 43 to provide cushion and traction for the belt 3 and to minimize wear on the pulley and belt.

The pulley thus provided is extremely rigid and capable of withstanding heavy tensions and load conditions with a minimum of stress and distortion, as the webs 40, 41, and 42 distribute the working stresses applied to the pulley in a most efficient manner.

As seen in the drawings, the head pulley 4 is mounted on the output shaft of the reducer by means of two keys 44 spaced 120° apart to provide most efficient operation and least wear and stress on the pulley hub, keys, and output or drive shaft 20. When thus mounted, the hub 38 is closely adjacent the boss 45 at the end of the bearing housing 32, and the pulley shell actually extends over or encircles the bearing 34 and a portion of the bearing housing 32. However, this arrangement makes it possible to have a relatively short moment arm on the extending portion 37 of the pulley drive shaft 20, the length of the moment arm in this case being the distance between the center of the hub 38 and the center of the bearing 34. As may be readily seen from the drawing, this moment arm is not excessively long, and the drive shaft and the bearings for the shaft are not placed under any undue stress or strain. The ribs 33 support the bearing housing 32 and bearing 34 adequately to eliminate shaft distortions and other possible causes of mechanical failure under high-tension heavy-duty operation.

It is deemed apparent from the above that I have eliminated the problems present in heavy-duty conveyor belt drives, as there is no longer any possibility of mechanical difficulties or breakdowns due to shaft misalinements; there is no longer any need for excessively large bases to provide rigidity of the assembly; there is no need for excessively large supporting structures for mounting heavy-duty conveyor drives, as we have reduced the physical size of the drive assembly; there is no longer any problem of mounting the drive pulley, and no problem of, or danger in, servicing the drive mechanism, as all servicing is confined to the reducer and this servicing merely comprises a seasonal oil change; the need for a high-torque back-stop is eliminated when a conventional gear speed reducer is employed since these units are well developed and not likely to fail so completely that the low-torque back-stop cannot function properly; and the problem of maintenance has been reduced to a minimum, as the number of component parts of the drive mechanism has been reduced materially, and there are fewer parts to cause troubles, and, in addition, maintenance has been simplified in providing for less difficulties in changing pulleys.

In addition, I have provided a saving of several thousand dollars in the initial cost of a heavy-duty drive assembly by reducing the number of parts and the size of the unit overall.

All of the above advantages have been accomplished as a result of my radical departure from the engineering principles which have been accepted and common practice since the inception of heavy duty conveyor drives wherein the smallest possible diameter of drive pulley, sprocket or gear on the output shaft of a speed reducer.

Having thus described my invention, what I claim is:

1. As a new article of manufacture a unitary heavy duty drive assembly for a heavy duty conveyor belt comprising a motor of relatively high horsepower and having a drive shaft transmitting 100 horsepower or more, a casing mounted adjacent said motor, a high-speed input shaft extending from said housing, means for coupling said input shaft to said shaft of said motor, a low-speed output shaft extending from said casing, means within said casing connecting said high-speed shaft to said low-speed shaft to drive the latter at low speed, and a pulley mounted on said output shaft, said pulley having a wide shell to drivingly receive said belt, and being of a diameter at least six times greater than the diameter of said low speed shaft.

2. As a new article of manufacture a drive for a heavy duty conveyor belt comprising a drive pulley over which said belt is wrapped to receive its driving effort, a casing, an output shaft extending from said casing on which said pulley is drivingly mounted, means mounting said shaft whereby a relatively short moment arm is obtained to sustain the load of driving said pulley and belt, an input shaft extending from said casing in spaced relation to said output shaft, a motor of one hundred horsepower or more operatively connected with said input shaft, and means within said casing connecting said input and output shafts to cause the speed of rotation of said output shaft to be less than the speed of rotation of said input shaft, said pulley being at least six times greater in diameter than the diameter of said output shaft.

3. A heavy duty drive assembly for a heavy duty conveyor belt comprising a motor of one hundred horsepower or more and having a drive shaft, a casing mounted adjacent said motor, a high-speed input shaft extending from said housing and being coupled to said shaft of said motor, a low-speed output shaft extending from said casing, means within said casing connecting said high-speed shaft to said low-speed shaft to drive the latter so as to transmit substantially one hundred horsepower or more, and a pulley mounted on said output shaft, said pulley having a wide shell and a relatively narrow hub disposed centrally thereof both diametrically and transversely, and means mounting said low-speed shaft in laterally extended relation to said casing whereby a relatively short moment arm is obtained to sustain the load of driving said pulley and belt, said pulley being at least six times greater in diameter than the diameter of said output shaft.

4. A unitary heavy duty drive for a high horsepower, high tension conveyor belt comprising in combination, a heavy duty speed reducer having a low speed shaft extending therefrom, means to rotate said shaft at low speed to deliver one hundred horsepower or more, and a heavy duty belt drive pulley mounted on said shaft as an overhung load, said pulley being more than six times greater in diameter than the diameter of said output shaft.

References Cited in the file of this patent
UNITED STATES PATENTS

| | | |
|---|---|---|
| 1,152,597 | Bowers | Sept. 7, 1915 |
| 2,523,887 | Thomson | Sept. 26, 1950 |

OTHER REFERENCES

P. T. C. Bulletin, No. 152, March 1951. (Copy available in Div. 12.)